United States Patent
Taheri et al.

(10) Patent No.: US 10,986,026 B2
(45) Date of Patent: Apr. 20, 2021

(54) PROPORTIONAL INTEGRAL BASED SHAPER FOR LOSSLESS OUTPUT BUFFER

(71) Applicant: Cisco Technology, Inc., San Jose, CA (US)

(72) Inventors: Parvin Taheri, Mountain View, CA (US); Sha Ma, Palo Alto, CA (US); Thomas J. Edsall, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/437,887

(22) Filed: Jun. 11, 2019

(65) Prior Publication Data

US 2020/0396167 A1 Dec. 17, 2020

(51) Int. Cl.
*H04L 12/863* (2013.01)
*H04L 12/815* (2013.01)
*H04L 12/801* (2013.01)
*H04L 12/835* (2013.01)

(52) U.S. Cl.
CPC ............ *H04L 47/225* (2013.01); *H04L 47/29* (2013.01); *H04L 47/30* (2013.01); *H04L 47/621* (2013.01)

(58) Field of Classification Search
CPC . H04L 47/50; H04L 47/6275; H04L 47/6255; H04L 67/1097; H04L 47/30; H04L 47/2441; H04L 43/16; H04L 47/26; H04L 47/25; H04L 49/90; H04L 12/863;
(Continued)

(56) References Cited

U.S. PATENT DOCUMENTS

| 5,541,912 A | 7/1996 | Choudhury et al. |
| 6,192,422 B1 * | 2/2001 | Daines ............. H04L 12/46 709/232 |

(Continued)

OTHER PUBLICATIONS

A. Kabbani, et al., "AF-QCN: Approximate Fairness with Quantized Congestion Notification for Multi-tenanted Data Centers", 2010 IEEE 18th Annual Symposium on High Performance Interconnects (HOTI), Aug. 18-20, 2010, Mountain View, CA, 8 pages.

(Continued)

*Primary Examiner* — Man U Phan
(74) *Attorney, Agent, or Firm* — Edell, Shapiro & Finnan, LLC (57) ABSTRACT

A network device includes network ports to communicate with source devices and destination devices. The network device receives respective packets from each source device and, for each source device, respectively performs the following operations. The network device stores the respective packets in a shared memory that stores all packets from all of the source devices, and dequeues the respective packets from the shared memory to send the packets to destination devices. Responsive to the storing and the dequeuing, the network device respectively increases and decreases an input packet count for the source device. The network device determines for the source device a packet sending rate based on the input packet count and a flow control threshold common across all of the source devices in accordance with a proportional integral (PI) control equation. The network device transmits to the source device a control message including the packet sending rate.

20 Claims, 8 Drawing Sheets

(58) Field of Classification Search
CPC ... H04L 12/865; H04L 12/835; H04L 12/825;
H04L 12/861
USPC .......................................................... 370/229
See application file for complete search history.

(56) References Cited

U.S. PATENT DOCUMENTS

| | | | | |
|---|---|---|---|---|
| 6,556,578 | B1* | 4/2003 | Silberschatz | H04L 47/10 370/234 |
| 6,917,585 | B1* | 7/2005 | Firoiu | H04L 47/283 370/229 |
| 7,969,881 | B2* | 6/2011 | Ansari | H04L 47/32 370/232 |
| 8,274,974 | B1* | 9/2012 | Gupta | H04L 47/30 370/389 |
| 8,407,364 | B2* | 3/2013 | Prabhakar | H04L 47/25 709/235 |
| 8,456,995 | B2* | 6/2013 | Fujihira | H04L 47/12 370/235 |
| 9,001,663 | B2* | 4/2015 | Attar | H04L 47/10 370/235.1 |
| 9,065,795 | B2* | 6/2015 | Prabhakar | H04L 47/11 |
| 9,166,925 | B2* | 10/2015 | Birke | H04L 47/30 |
| 9,237,107 | B2* | 1/2016 | Ansari | H04L 47/30 |
| 9,548,924 | B2* | 1/2017 | Pettit | H04L 47/125 |
| 9,614,765 | B2 | 4/2017 | Calavrezo et al. | |
| 10,069,744 | B2* | 9/2018 | De Schepper | H04L 43/0894 |
| 10,193,771 | B2* | 1/2019 | Koponen | H04L 49/252 |
| 10,200,277 | B2* | 2/2019 | Sreeramoju | H04L 45/24 |
| 10,530,678 | B2* | 1/2020 | Kommula | G06F 9/4856 |
| 10,567,300 | B2* | 2/2020 | Pan | H04L 47/6275 |
| 2015/0037291 | A1 | 2/2015 | Stephenne et al. | |
| 2015/0163142 | A1 | 6/2015 | Pettit et al. | |
| 2015/0163144 | A1 | 6/2015 | Koponen et al. | |
| 2018/0367464 | A1* | 12/2018 | De Schepper | H04L 47/31 |

OTHER PUBLICATIONS

Y. Zhu, et al., "Congestion Control for Large-Scale RDMA Deployments", SIGCOMM '15, Aug. 17-21, 2015, London, United Kingdom, 14 pages.

Zhang, et al., "Fair Quantized Congestion Notification in Data Center Networks", IEEE Transactions on Communications, vol. 61, No. 11, Nov. 2013, 10 pages.

Unknown, "Configuring Priority Flow Control", Cisco Nexus 9000 Series NX-OS Quality of Service Configuration Guide, Release 6.x, 12 pages, downloaded Jun. 11, 2019.

Unknown, "Priority Flow Control: Build Reliable Layer 2 Infrastructure", Cisco Systems, Inc. Sep. 2015, 8 pages, downloaded Jun. 11, 2019.

* cited by examiner

PROPORTIONAL INTEGRAL BASED SHAPER FOR LOSSLESS OUTPUT BUFFER

TECHNICAL FIELD

The present disclosure relates to flow control in a network.

BACKGROUND

Remote direct memory access (RDMA) deployment in modern data centers requires reliability over Layer (L) 2 links. Mechanisms such as Institute of Electrical and Electronics Engineers (IEEE) 802.3x Pause or IEEE 802.1Qbb Priority Flow Control (PFC) can be used to achieve a lossless network. During packet transfers from senders to an Ethernet switch, the switch can send to all or some of the senders Pause or PFC control frames when the switch is running out of buffer space for incoming packets. Upon receiving such control messages, the senders stop sending packets, therefore preventing packet drop at the switch/receiver. In the case of a shared buffer at the switch, the switch stops all of the senders if a total packet occupancy of the buffer is reaching the maximum buffer available. This is undesirable because only one sender may fill the whole buffer at the switch, but all senders are paused even though they are not all sending packets to a congested port causing the buffer to fill. This presents a problem of how to share the buffer across all input ports efficiently such that each input port gets a fair share of the total buffer and total buffer usage remains under the total buffer available. Another problem is head of line blocking (HOLB). If an input source is shared by two flows, one sending packets to a congested port and one sending packets to a non-congested port, the latter flow (i.e., the victim flow) should not be affected by the former flow.

DESCRIPTION OF EXAMPLE EMBODIMENTS

Overview

A network device includes network ports to communicate with source devices and destination devices. The network device receives respective packets from each source device. For each source device, the network device respectively performs the following operations. The network device stores the respective packets that are received in a shared memory used to store all packets that are received from all of the source devices, and dequeues the respective packets from the shared memory to send the packets to a respective one of the destination devices. Responsive to the storing and the dequeuing, the network device respectively increases and decreases an input packet count associated with the source device to indicate a contribution of the respective packets to a total packet occupancy of the shared memory. The network device determines for the source device a packet sending rate individualized to the source device based on the input packet count and a flow control threshold that is the same for all of the source devices in accordance with a proportional integral (PI) control equation. The network device transmits to the source device a control message including the packet sending rate.

Example Embodiments

Figure 1:
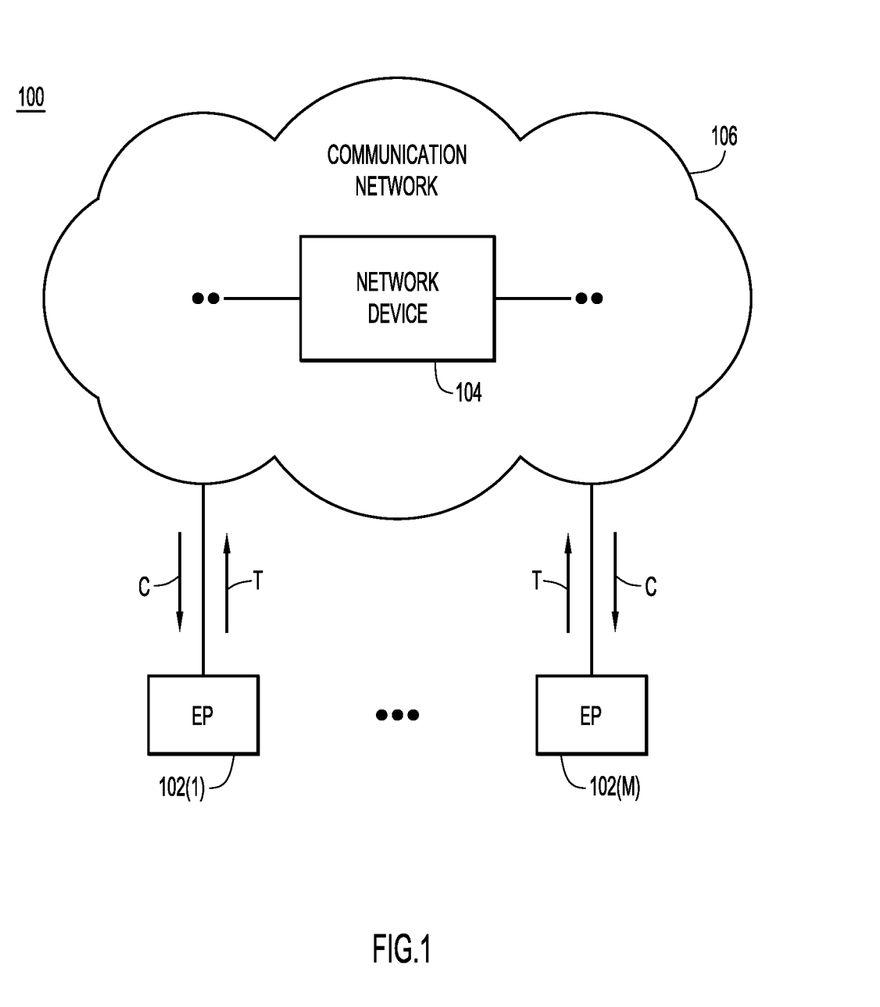
FIG. 1 is a block diagram of a network environment in which proportional integral (PI) control of traffic flows (i.e., PI flow control) may be implemented, according to an example embodiment.

With reference to FIG. 1, there is a block diagram of an example network environment 100 in which proportional integral (PI) control of traffic flows (i.e., PI flow control) may be implemented to solve the above-described problems. Network environment 100 includes endpoint (EP) devices 102(1)-102(M) (collectively referred to as "endpoint devices 102," and singularly referred to as an "endpoint device 102") connected to a network device 104, such as a router or switch, that resides in a communication network 106. Communication network 106 may include one or more local area networks (LANs) and one or more wide area networks (WANs) such as the Internet. Network device 104 routes traffic, e.g., data packets (or simply "packets") in the form of Internet Protocol (IP) packets, traversing communication network 106 to and from endpoint devices 102. With respect to network device 104, a given endpoint device 102(*i*) represents a source device 102(*i*) (or simply "source") when the endpoint device sends traffic to the network device, and the given endpoint device 102(*i*) represents a destination device 102(*i*) (or simply "destination") when the network device sends traffic to the endpoint device. Endpoint devices 102 may include server devices (e.g., "servers") hosted in data centers (not shown) and client devices (i.e., "clients") that communicate with each other through network device 104 in communication network 106, using any known or hereafter developed communication protocol, such as the Transmission Control Protocol (TCP)/IP or the like. It is understood that network environment 100 may include many more endpoint devices and network devices than are shown by way of example in FIG. 1. In the arrangement depicted in FIG. 1, network device 104 and network devices 102 may each be connected to network 106 and may communicate with each other over the network. Alternatively, some or all of endpoint devices 102 may be connected directly to network device 104 (via network ports of the network device), rather than to the network device through a network.

At a high-level, network device 104 receives incoming traffic flows T as streams of data packets (referred to simply as "packets") originating from various source devices among endpoint devices 102, stores the packets in output queues in a shared memory, uses respective input counters to count the numbers of packets received from respective ones of the various source devices and that are stored in the shared memory, and directs the packets from the output queues to various destination devices among the endpoint devices, based on 5-tuples in headers of the packets, which identify the traffic flows from their sources to their destinations. In accordance with embodiments presented herein, network device 104 includes PI controllers or shapers to shape, i.e., control, the data rates at which the source devices among endpoint devices 102 send their traffic to the network device. In the ensuing description, the data rate at which a source device sends traffic/packets is referred to as a "packet sending rate" (or simply a "sending rate") of the source device. The PI controllers perform/impose packet sending rate control in the form of PI control or shaping on the incoming/received traffic flows based on quantitative analysis of the respective input counters and an amount of free memory space available in the shared memory for storing packets at any given time.

The PI controllers determine individualized packet sending rates for (i.e., individually PI-shape the packet sending rates of) respective ones of the incoming/received traffic flows that feed/populate the shared memory, and transmit respective control messages C, including the determined packet sending rates, to respective ones of the source devices from which the respective traffic flows originate. Each endpoint device 102 controls the packet sending rate of the endpoint device in response to the determined packet sending rate indicated in respective message C.

Figure 2:
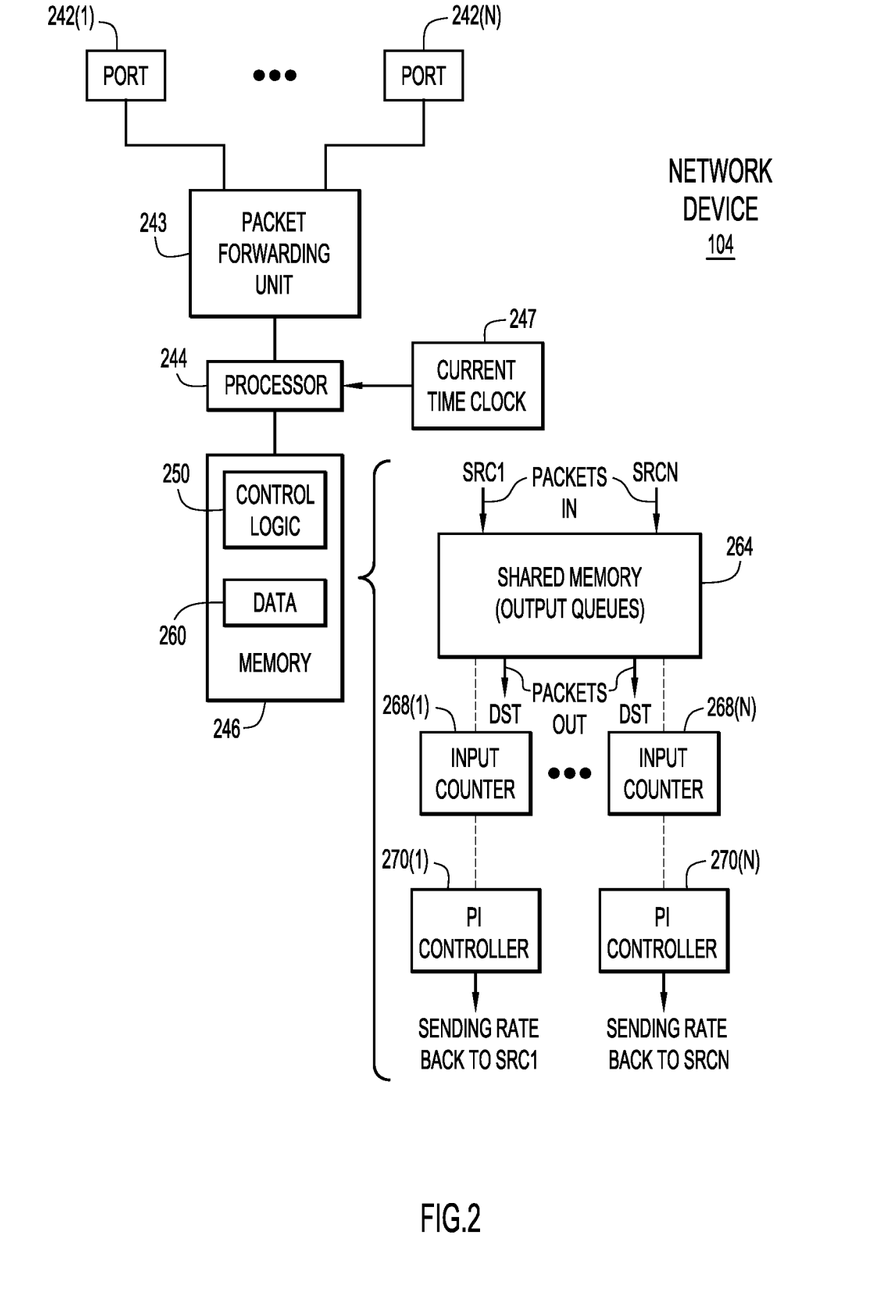
FIG. 2 is a block diagram of a network device configured to implement the PI control of traffic flows, according to an example embodiment.

With reference to FIG. 2, there is a block diagram of network device 104, according to an embodiment. Network device 104 comprises a plurality of network input/output (I/O) ports 242(1)-242(N) to send traffic (e.g., IP packets) to a network and receive traffic (e.g., IP packets) to the network, a packet forwarding/processing unit 243, a network processor 244 (also referred to simply as "processor"), a memory 246, and a current time clock 247 configured to provide sub-millisecond time stamps (e.g., time stamps with microsecond resolution) and time triggers to the ports and/or the network processor for the IP packets received on network ports 242(1)-242(N) and for various processes executed by the network processor. The packet forwarding/processing unit 243 is, for example, one or more application specific integrated circuits (ASICs) that include packet buffers, packet queues, and other control logic for performing packet forwarding operations. The processor 244 is a microcontroller or microprocessor that is configured to perform higher level controls of network device 104. To this end, the memory 246 stores software instructions that, when executed by the processor 244, cause the processor 244 to perform a variety of operations including operations described herein. For example, the memory 246 stores instructions for control logic 250 to perform operations described herein. Control logic 250 may also include logic components in packet forwarding unit 243. Memory 246 also stores data 260 used and generated by control logic 250. Such data may include output queues and related parameters (e.g., buffer size, change in size, and so on), thresholds, packet sending rates, PI control parameters, and the like, as will be described below.

In accordance with embodiments presented herein, memory 246 includes a shared memory 264 of fixed memory size that includes output queues (not shown) to store, temporarily, packets received from source devices Src1-SrcN (e.g., various ones of endpoint devices 102) via network ports 242(1)-242(N), until the stored packets are depopulated from the output queues to be sent to various destination devices (e.g., various ones of endpoint devices 102). In this example, there are N source devices, but it is understood there may be less than N source devices. Memory 246 also includes shallow input buffers (not shown) to initially buffer the packets received from source devices Src1-SrcN. Control logic 250 implements input counters 268(1)-268(N) (collectively referred to as "input counters 268") to count the packets received from respective ones of source devices Src1-SrcN and that are stored to the output queues of shared memory 264, and PI controllers 270(1)-270(N) associated with respective ones of the input counters. Each input counter 268($i$) tracks how many packets from each corresponding source device Srci (where i is 1, 2, . . . , N) are stored in shared memory 264 at any given time. That is, each input counter 268($i$) indicates the contribution of the respective packets from each corresponding source device Srci to a total packet occupancy of shared memory 264.

More specifically, for each packet received from source device Srci and stored in shared memory 264 (e.g. in an output queue), corresponding input counter 268($i$) increases (e.g., increments) a respective input packet count indicated by the input counter. Also, each time a packet from source device Srci is dequeued from shared memory 264 (e.g., from the output queue) to be sent to a destination device, corresponding input counter 268($i$) decreases (e.g., decrements) the respective input packet count. The amount of increase/increment or decrease/decrement of the input packet count per packet may be unitary or may be equal to a size of the packet (e.g., in bytes) and, therefore, the amount of memory occupied by the packet when in shared memory 264. Thus, input counter 268($i$) indicates a respective contribution of the respective packets from source device Src1 to a total packet occupancy of shared memory 264, at any given time, because shared memory 264 is shared across/used by all source devices Src1-SrcN, which collectively contribute to the total occupancy of the shared memory. PI controllers 270(1)-270(N) determine/compute respective packet sending rates for respective ones of the source devices Src1-SrcN based on the input packet count of respective ones of input counters 268(1)-268(N) and an amount of free memory space available in shared memory 264, and then transmit the determined packet sending rates to the source devices, as described below.

Various problems associated with flow control of traffic under congested conditions, such as head-of-line blocking (HOLB), are now described with reference to FIGS. 3-5, after which embodiments presented herein to overcome the problems will be described with reference to FIGS. 6-9.

Figure 3:
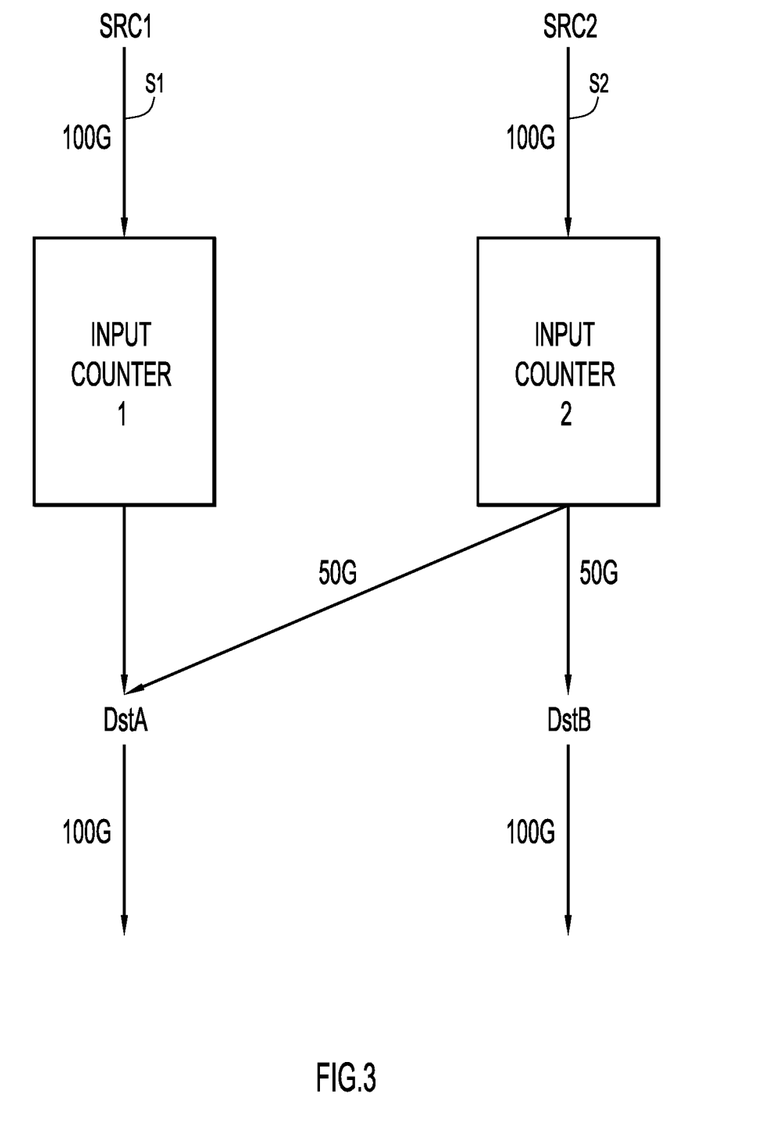
FIG. 3 is an illustration of a congestion scenario in which source devices send streams of packets to destination devices, according to an example embodiment.

With reference to FIG. 3, there is an illustration of a congestion scenario in which source devices Src1, Src2 (e.g., two of endpoint devices 102) send 100 Gbps incoming traffic streams of packets S1, S2 to destinations DstA, DstB (e.g., two of endpoint device 102), respectively, through a network device (e.g., network device 104). Thus, the packet sending rates of source devices Src1, Src2 are each 100 Gbps. The network device includes input counters 1, 2 (e.g., two of counters 268(1)-268(N)) to count how many packets from source devices Src1, Src2 are stored in shared memory of the network device, respectively. All of the packets of incoming traffic stream S1 and half of the packets of incoming traffic stream S2 are destined for DstA, resulting in a total rate destined for destination DstA of 100 Gbps+50 Gbps=150 Gbps. The other half of the incoming traffic stream S2 is destined for destination DstB, resulting in a total rate destined for destination DstB of 50 Gbps. Destinations DstA, DstB have respective maximum incoming rate limits of 100 Gbps (i.e., are rate limited to 100 Gbps). Thus, the traffic path to destination DstA is congested because the rate destined for DstA exceeds the incoming rate limit of DstA, while the traffic path to DstB is not congested because the rate destined for DstB is less than the I incoming rate limit of DstB.

Figure 4:
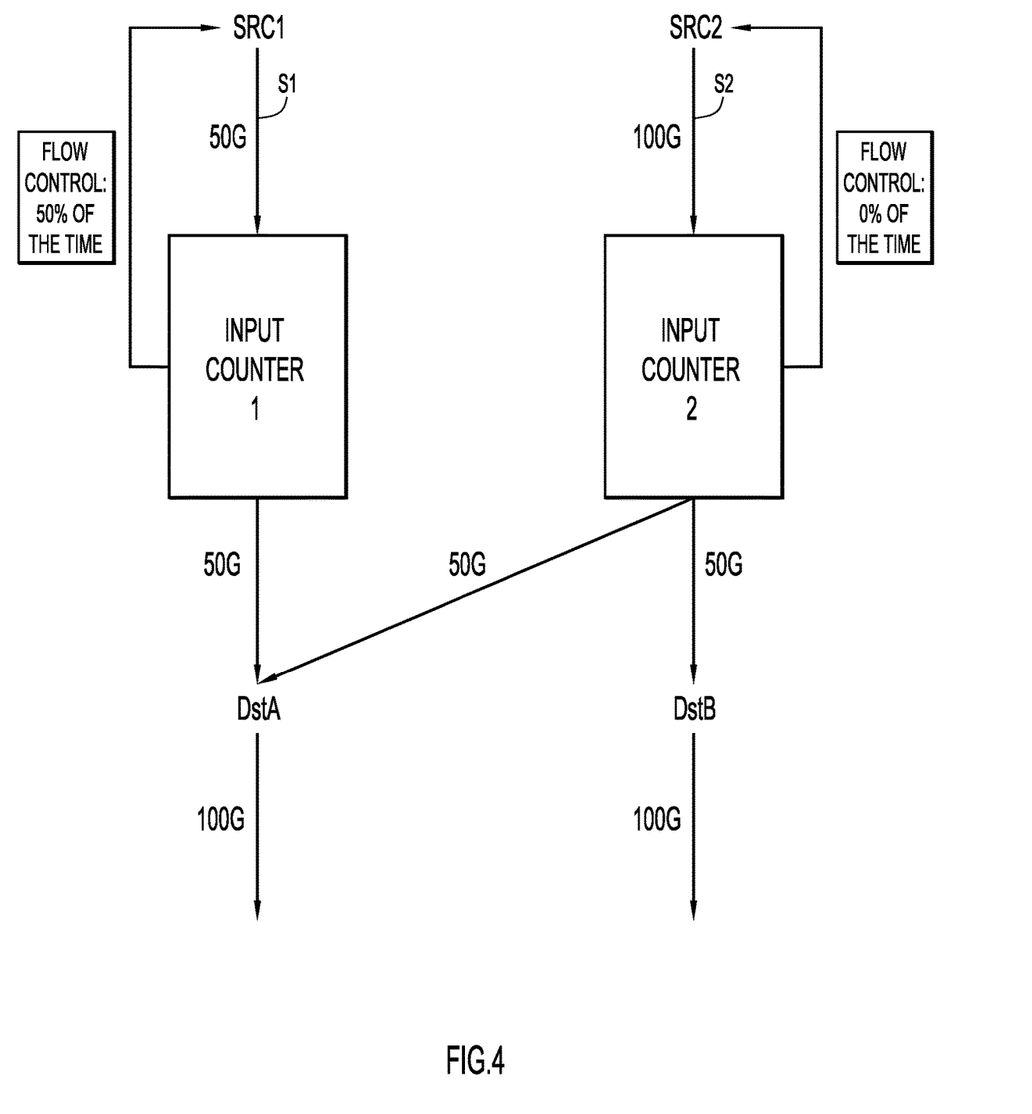
FIG. 4 is an illustration of ideal flow control for the congestion scenario of FIG. 3, according to an example embodiment.

With reference to FIG. 4, there is an illustration of ideal flow control for the congestion scenario presented in FIG. 3. As shown in FIG. 4, for ideal flow control, the network device asserts flow control over source device Src1 to cause Src1 to reduce its packet sending rate by 50% to 50 Gbps, but does not assert any flow control over source device Src2. To implement flow control over a given source device, the network device may send to the given source device transmit on "XON" and transmit off "XOFF" (i.e., pause) commands to cause the given source to transmit packets and to not transmit packets, respectively, based on the input packet count indicated by the input counter associated with the given source device relative to a flow control threshold. In FIG. 4, the XON/XOFF commands are represented by the feedback arrows from input counters 1, 2 to source devices Src1, Src2. Such binary XON and XOFF commands provide only coarse control over the packet sending rates of the given source device. In operation, the network device sends to source device Src1 the XOFF command only when the input packet count indicated by input counter 1 is greater than, i.e., exceeds, the flow control threshold, otherwise the network device sends the XON command. Ideally, the network device sends the XOFF command to source device Src1 only 50% of the time, and never sends the XOFF command to source device Src2. In practice, however, use of the binary XON/XOFF commands may disadvantageously lead to head-of-line blocking (HOLB), as shown in FIG. 5.

Figure 5:
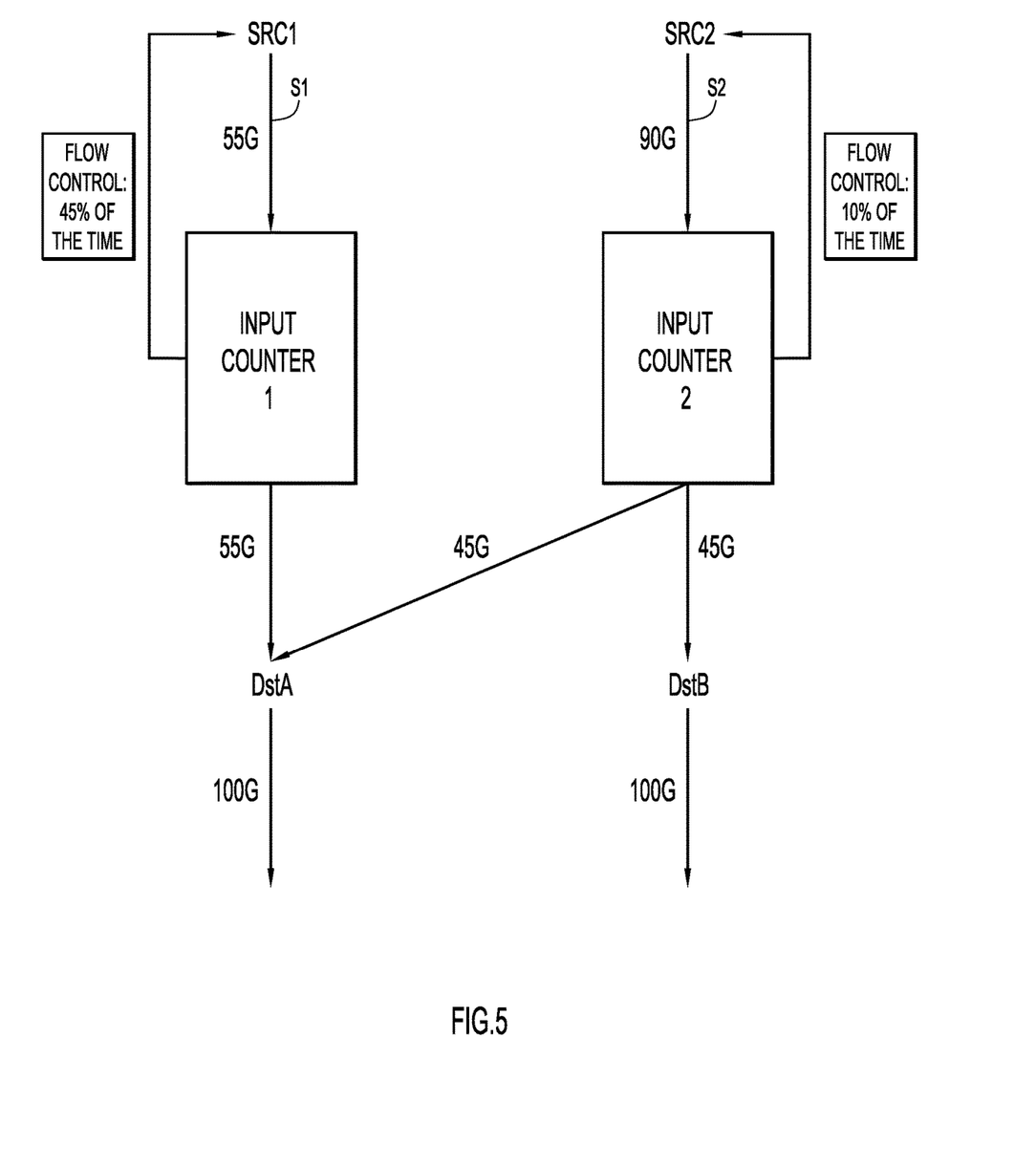
FIG. 5 is an illustration of flow control using only transmit on (XON)/transmit off (XOFF) commands in the congestion scenario of FIG. 3, which leads to head-of-line blocking (HOLB), according to an example embodiment.

With reference to FIG. 5, there is an illustration of flow control using the binary XON/XOFF commands for the congestion scenario that leads to head-of-line blocking (HOLB). Because source devices Src1, Src2 share a common, i.e., the same, output queue leading to destination DstA, the mixture of the packets from both of the source devices in that output queue affects a respective short-term dequeue rate for each input counter. As alluded to above, input counter 2 for source device Src2 needs to stay below the flow control threshold so that Src2 stays un-paused, i.e., so that the network device does not send the XOFF command to Src2; however, because the short-term dequeue rate for Src2 is volatile, input counter 2 for source Src2 may occasionally "back-up" and rise above the flow control threshold. In response, the network device sends the XOFF to source device Src1 and, occasionally, to source device Src2 as well, leading to a loss in packet sending rate on the congested flow to destination device Dst1 and a loss in packet sending rate on the uncongested flow to destination device Dst2—the victim flow. The resulting non-ideal flow control with HOLB is as shown in FIG. 5, in which the network device sends XOFF commands to source device Src2 to slow down its packet sending rate to 45 Gbps (instead of the desired 50 Gbps), and the network device also sends XOFF commands to source Src1 to slow down its packet sending rate to 55 Gbps.

Other than HOLB, the above-described solution has the following disadvantages. First, the memory for storing packets in the network device may not be truly shared across source devices. Thus, to ensure fairness across source devices, each source device needs additional memory, which remains unused if an associated source device is inactive. A better solution shares the memory among all active source devices. Second, the use of binary XON/XOFF commands provides only a relatively coarse control of packet sending rate, which overcompensates for relatively small variations of the input packet count indicated by the corresponding input counter relative to the flow control threshold. The better solution uses a fine control of packet sending rate compared to the coarse control.

To avoid HOLB and other disadvantages described above, flow control according to embodiments presented herein employs a PI-based shaper (i.e., the PI controller) to flow control source devices, rather than only binary XON/XOFF commands. In the embodiments, for each source device, a respective PI controller calculates an individualized (correct) packet sending rate for the source device, and applies the calculated rate to the sending source. Using a PI controller implies having an input buffer. Therefore, a shallow input buffer per source device is used so that the PI controller can smooth-out jumps in the packet sending rate that may result from XON/XOFF commands under some conditions.

An advantage of using the PI controller is that it is able to surpass short-term variations in a dequeue rate of a source device, therefore finding the correct packet sending rate that matches the smoothed dequeue rate of the source device. A binary XON/XOFF flow control can be considered as a feedback loop with a fixed gain of 1 while a PI controller can be tuned to have a smaller gain. This way the mixture of packets at any given output queue has very low impact on the rate calculation.

Figure 6:
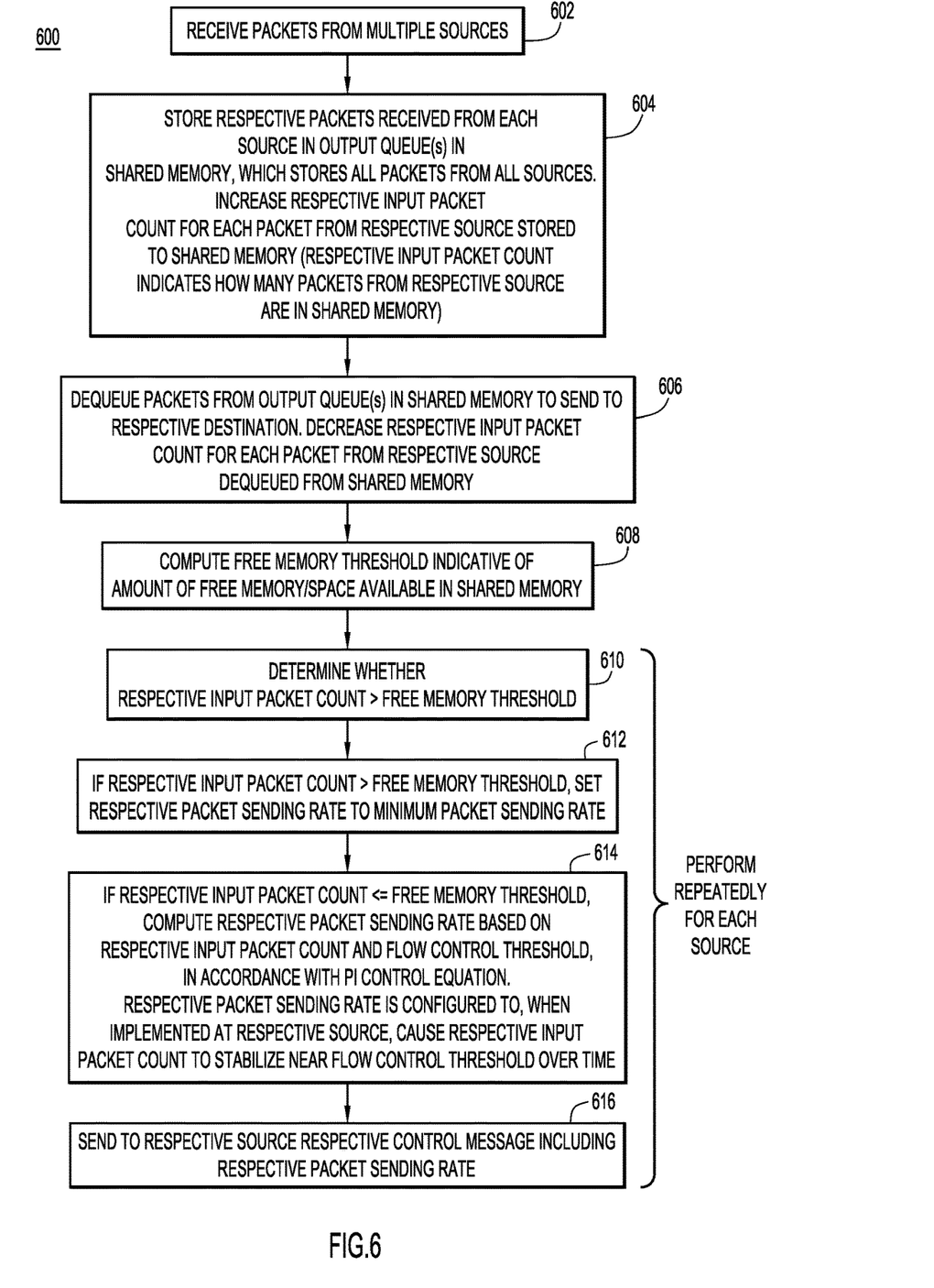
FIG. 6 is a flowchart of a method of flow control using PI flow control, performed by the network device, according to an example embodiment.

With reference to FIG. 6, there is a flowchart of an example method 600 of flow control using the PI controllers, performed by network device 104. Method 600 assumes that endpoint devices 102(1)-102(M) (i.e., source devices) send respective sequences of packets to network device 104. Network device 104 switches/routes the respective sequences of packets to various destination devices, e.g., to various one of endpoint devices 102. The packets include header information to identify respective source devices among endpoint devices 102 and destination devices among the endpoint devices.

At 602, network device 104 receives the respective sequences of packets from respective ones of endpoint devices 102(1)-102(M) connected to, and configured to communicate with, respective network ports among network ports 242(1)-242(N).

At 604, network device 104 stores the respective packets received from each endpoint device 102(i) in one or more output queues of shared memory 264. Shared memory 264 stores all packets from all endpoint devices 102. Network device 104 maps a respective source identity of each endpoint device 102(i) indicated in the respective packets from that endpoint device to a corresponding input counter 268(i). For each packet received from endpoint device 102(i) (as identified by the source identity in the packet) and that is stored in shared memory 264, network device 104 increases/ increments an input packet count indicated by corresponding input packet counter 268(i).

At 606, network device 104 depopulates or dequeues the packets stored in shared memory 264 when sending the packets to one or more destination devices, e.g., to various ones of endpoint devices 102. For each packet from endpoint device 102(i) that is dequeued from shared memory 264, network device 104 decreases/decrements the input packet count indicated by input packet counter 268(i). Thus, responsive to storing and dequeuing operations 604 and 606, network device 104 respectively increases and decreases the input packet count associated with endpoint device 102(i) to indicate the contribution of the respective packets from the endpoint device to the total packet occupancy of shared memory 264.

In an embodiment, next operations 608-616 are performed repeatedly at a first frequency, e.g., every 1 us, with respect to each of (source) endpoint devices 102(1)-102(M) independently of the other endpoint (source) devices.

At 608, network device 104 monitors/determines an amount of free memory space (free_cnt) available in shared memory 264 for storing packets. The free memory space (free_cnt) at any given time is equal to a difference between the fixed memory size of shared memory 264 and a sum of all packet occupancies in the shared memory from all endpoint devices 102(1)-102(M) (i.e., a total packet occupancy of the shared memory). Network device 104 also computes a dynamic free memory threshold based on, and indicative of, the free memory space (free_cnt). In an example, the free memory threshold is equal to ($\alpha$*free_cnt), where $\alpha$ is a configurable parameter between 0 and 1. Thus, the free memory threshold represents a configurable amount of shared memory space. The free memory threshold is employed by a mechanism (see operations 610 and 612 described below) that reacts at a packet time scale to ensure that the packet occupancy in the shared memory due to any one source device does not grow too large, and that the total packet occupancy of the shared memory does not grow beyond the fixed memory size of shared memory 264.

At 610, network device 104 determines whether the input packet count indicated by input counter 268(i) exceeds the free memory threshold.

At 612, if the input packet count indicated by input counter 268(i) exceeds the free memory threshold, the packet occupancy of shared memory 264 due to packets from endpoint device 102(i) is deemed to be too big relative to the remaining amount of free memory space, and network device 104 sets a respective packet sending rate (paced_rate) for endpoint device 102(i) to a predetermined minimum packet sending rate (min_rate) according to the following equation: paced_rate=min_rate.

At 614, if the input packet count indicated by input counter 268(i) does not exceed the free memory threshold, network device 104 computes the packet sending rate (paced_rate) for endpoint device 102(i) based on the input packet count (input_cnt) indicated by input counter 268(i) and a flow control threshold (Flow_Control_Threshold) for the input packet count that is global (i.e., the same flow control threshold is used to compute the packet sending rates for all of the endpoint devices), in accordance with the following PI control equations:

1) paced_rate=pace_rate−$A$*(input_cnt−Flow_Control_Threshold)−$B$*(input_cnt−old_input_cnt), where    1)

paced_rate is the (current) packet sending rate,
old_input_cnt is a previous input packet count,
pace_rate is a previously computed packet sending rate associated with the previous input packet count, and A and B are PI control parameters having respective fractional values less than 1, e.g., $0.7/2^7$ and $0.7/2^5$; and old_input_cnt=input_cnt.    2)

Repeated iterations through operation 614 over time change the packet sending rate for each endpoint device 102(i) until the input packet count indicated by input counter 268(i) is equal to, or stabilizes around, the flow control threshold (Flow_Control_Threshold).

The flow control threshold may be a predetermined static threshold. Alternatively, the flow control threshold may be a dynamic threshold in order to share shared memory 264 across all active endpoint devices. When dynamic, the flow control threshold may be computed as follows:

FlowControl_Threshold=$\beta$*(free_cnt−(CONST)), unless free_cnt<CONST, in which case Flow_Control_Threshold is set equal to zero, where $\beta$ is a parameter between 0 and 1, and
CONST is a configurable constant>=1.

The flow control threshold is used across all active source devices. An advantage of this is that relatively lower and higher numbers of active source devices result in relatively higher and lower amounts of shared memory 264 for each active source, respectively, which leads to a fair allocation of resources across all of the source devices.

At 616, network device 104 generates and then transmits/sends to endpoint device 102(i) a control message (e.g., control message C shown in FIG. 1) including the packet sending rate (paced_rate) determined at 612 or 614. Network device 104 generates a respective control message per (source) network port of the network device per endpoint device. Endpoint device 102(i) receives the control message and, responsive to the control message, sets its packet sending rate equal to the packet sending rate (paced_rate) in the control message.

Figure 7:
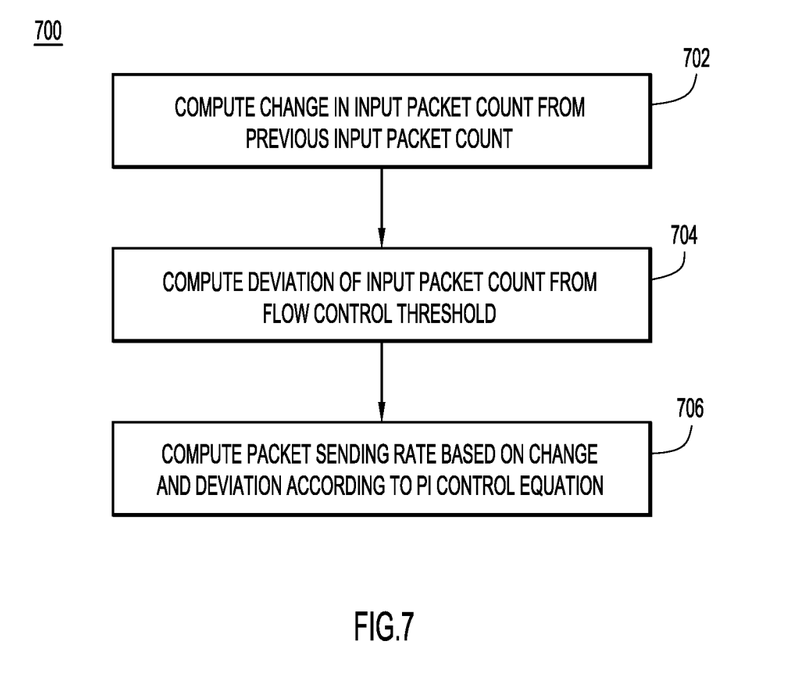
FIG. 7 shows operations expanding on an operation to compute a packet sending rate in the method of FIG. 6, according to an example embodiment.

With reference to FIG. 7, there are shown operations 700 expanding on operation 614 to compute the packet sending rate (paced_rate) in accordance with PI control equation (1).

At 702, network device 104 computes a change/difference ($\Delta_1$) in the input packet count (input_cnt) from the previous input packet count (old_input_cnt), which was the input packet count in the previous pass through operation 614, as follows:

$\Delta_1$=input_cnt−old_input_cnt.

At 704, network device 104 computes a deviation/difference ($\Delta_2$) in the input packet count (input_cnt) from the flow control threshold (Flow_Control_Threshold) as follows:

$\Delta_2$=input_cnt−Flow_Control_Threshold.

At 706, network device 104 computes the (current) packet sending rate (paced_rate) according to the following:

paced_rate=pace_rate−$A$*$\Delta_1$−$B$*$\Delta_2$.

As described above, operations 610 and 612 of method 600 provide a first layer of congestion protection, which reduces the packet sending rate (paced_rate) in a single update/iteration through method 600 when the input packet count indicated by input counter 268(i) is too high. When this happens, network device 104 commands corresponding endpoint device 102(i) to reduce its packet sending rate to the minimum packet sending rate, in which case the endpoint device continues to send packets, albeit at the minimum packet sending rate. Embodiments presented herein also provide an optional second, more drastic, layer of congestion protection in the event that packet occupancy of the shared memory due to any given endpoint device 102(i)

grows too big. In the second layer of congestion protection, network device 104 commands endpoint device 102(i) to cease sending packets altogether (i.e., to pause) when the input packet count indicated by corresponding input counter 268(i) grows too big, as described in further detail below with reference to FIG. 8. The second layer of congestion protection may be implemented to react faster than the flow control adjustments provided in method 600, as described below.

Figure 8:
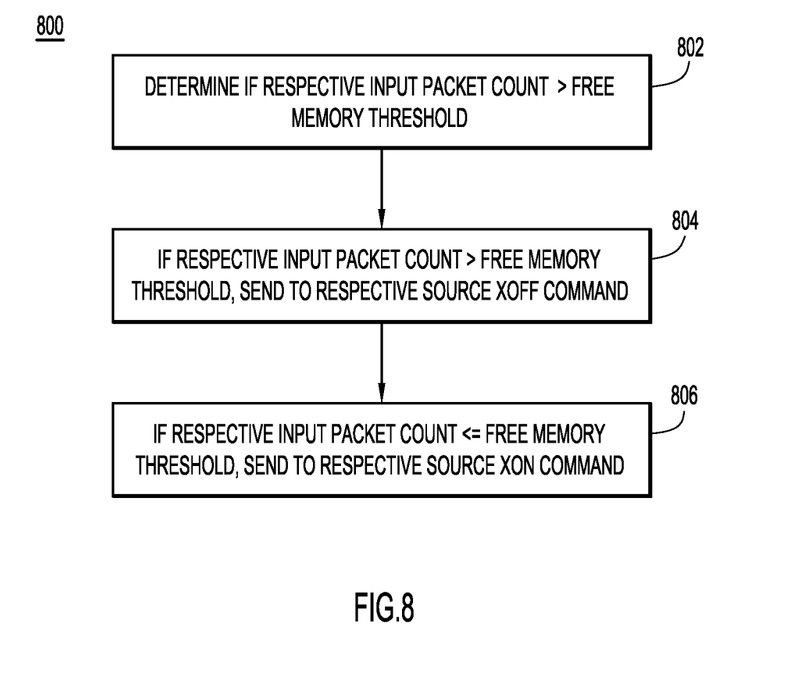
FIG. 8 is a flowchart of a method of further flow control including pause control to prevent overfilling of shared memory in the network device with received packets, according to an example embodiment.

With reference to FIG. 8, there is shown a flowchart of an example method 800 of further flow control of endpoint (source) devices 102 when the input packet counts indicated by their respective input counters 268 grow too large. Method 800 may be referred to as a pause control method. Method 800 may be performed repeatedly with respect to each endpoint device 102(i) independently of the other endpoint devices. Method 800 may be performed repeatedly at a second frequency (e.g., less than every 1 us) that is higher than the first frequency at which PI control operations 614, 616 are performed repeatedly (e.g., every 1 us), to achieve more immediate flow control effects compared to method 600.

At 802, network device 104 determines whether the input packet count for input counter 268(i) allocated to endpoint device 102(i) is greater than the free memory threshold computed in operation 608 described above.

At 804, if the input packet count exceeds the free memory threshold, network device 104 transmits to endpoint device 102(i) a respective XOFF command to cause the endpoint device to stop sending packets. Network device 104 may send the XOFF command in a control message that also includes the packet sending rate available from a last iteration of operations 612/614.

At 806, if the input packet counter does not exceed the free memory threshold, network device 104 sends to endpoint device 102(i) a respective XON command to cause the endpoint device to send packets. Network device 104 may send the XON command in a control message that also includes the packet sending rate available from the last iteration of operations 612/614.

In summary, in method 800, if the input packet count exceeds or does not exceed the free memory threshold, network device 104 commands the corresponding source device to not send packets (via XOFF) or to send packets (via XON), respectively.

Method 800 may be performed independently from method 600. Alternatively, method 800 may be integrated into method 600, e.g., the appropriate one of the respective XOFF command and the respective XON command may be sent to endpoint device 102(i) at operation 616 depending on the outcome/result of the test in operation 610. Also, the appropriate one of the respective XOFF command and the respective XON command may be included in the control message sent in operation 616 along with the computed packet sending rate, or may be sent in a separate control message. When the control message includes the computed packet sending rate and the XOFF command, the endpoint (source) device that receives the control message ignores the packet sending rate. Conversely, when the control message includes the computed packet sending rate and the XON command, the endpoint (source) device that receives the control message applies the computed packet sending rate.

Figure 9:
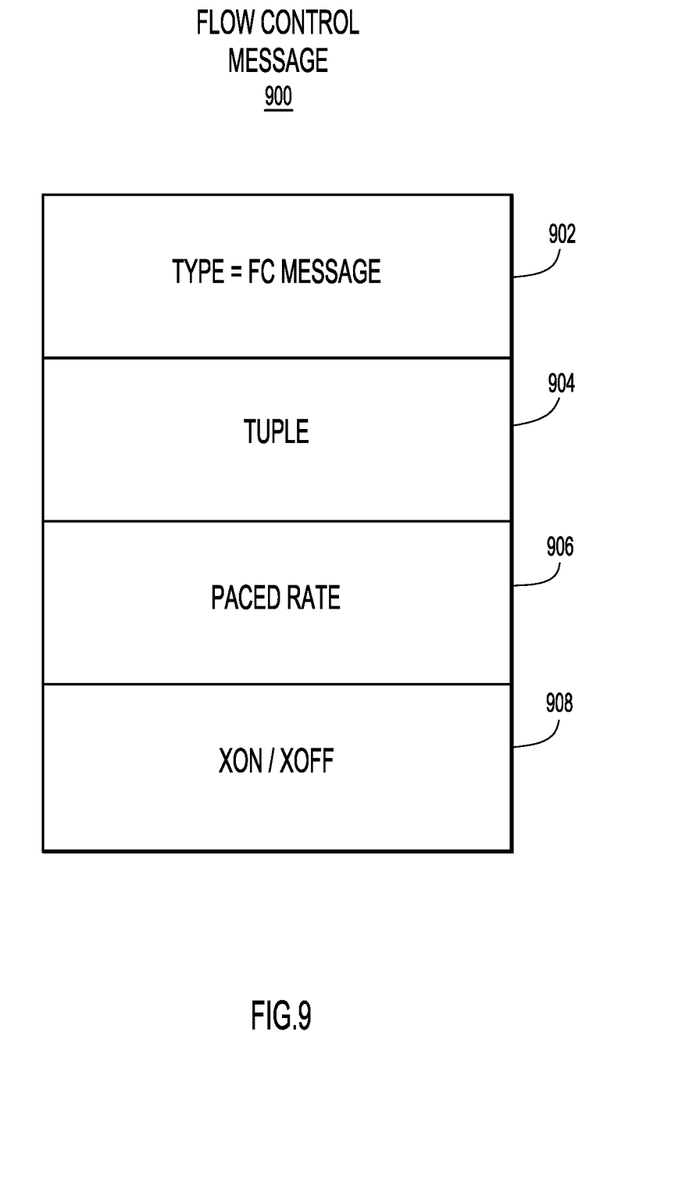
FIG. 9 is an illustration of a control message sent by the network device to a source device to control a packet sending rate of the source device, according to an example embodiment.

With reference to FIG. 9, there is an illustration of an example flow control message 900 sent from network device 104 to a source device to perform flow control (i.e., packet sending rate control) on the source device. Control message 900 includes a type field 902 to indicate that the message is a flow control (FC) message, a tuple 904 that conveys address information including a source address of a source device, a paced rate field 906 conveying a multi-bit value for a computed packet sending rate, and an XON/XOFF field 908 conveying a XON command or a XOFF command.

In summary, according to the embodiments, each source device among multiple source devices is allocated, respectively, a shallow input buffer, an input counter to indicate an input packet count of the number of packets received from the source device and stored in a shared output buffer (referred to above as the "shared memory"), and a PI controller. The PI controller calculates the correct packet sending rate for the source device based on the input packet count and a flow control threshold in accordance with a PI equation. The packet sending rate is sent to the source device, which sets its actual packet sending rate equal to the packet sending rate calculated by the PI controller. The source device is paused (via XOFF command) only after its contribution to the shared output buffer grows beyond a configured threshold (the free memory threshold). The PI controller smooths the packet sending rate relative to the binary XOFF/XON command approach to flow control. Also, dynamic flow control thresholding for lossless traffic is used.

In one form, a method is provided comprising: at a network device having network ports to communicate with source devices and destination devices over a network, receiving respective packets from each source device, and for each source device, respectively: storing the respective packets that are received in a shared memory used to store all packets that are received from all of the source devices; dequeuing the respective packets from the shared memory to send the packets to a respective one of the destination devices; responsive to the storing and the dequeuing, respectively increasing and decreasing an input packet count associated with the source device to indicate a contribution of the respective packets to a total packet occupancy of the shared memory; determining for the source device a packet sending rate individualized to the source device based on the input packet count and a flow control threshold that is common across all of the source devices in accordance with a proportional integral (PI) control equation; and transmitting to the source device a control message including the packet sending rate.

In another form, an apparatus is provided comprising: network ports to communicate with source devices and destination devices over a network; and a processor coupled to the network ports and configured to perform receiving respective packets from each source device, and for each source device, respectively, perform operations including: storing the respective packets that are received in a shared memory used to store all packets that are received from all of the source devices; dequeuing the respective packets from the shared memory to send the packets to a respective one of the destination devices; responsive to the storing and the dequeuing, respectively increasing and decreasing an input packet count associated with the source device to indicate a contribution of the respective packets to a total packet occupancy of the shared memory; determining for the source device a packet sending rate individualized to the source device based on the input packet count and a flow control threshold that is common across all of the source devices in accordance with a proportional integral (PI) control equation; and transmitting to the source device a control message including the packet sending rate.

In yet another form, a non-transitory computer readable medium is provided. The computer readable media is encoded with instructions that, when executed by a processor of a network device having network ports to communicate with source devices and destination devices over a network, cause the processor to perform, receiving respective packets from each source device, and for each source device, respectively: storing the respective packets that are received in a shared memory used to store all packets that are received from all of the source devices; dequeuing the respective packets from the shared memory to send the packets to a respective one of the destination devices; responsive to the storing and the dequeuing, respectively increasing and decreasing an input packet count associated with the source device to indicate a contribution of the respective packets to a total packet occupancy of the shared memory; determining for the source device a packet sending rate individualized to the source device based on the input packet count and a flow control threshold that is common across all of the source devices in accordance with a proportional integral (PI) control equation; and transmitting to the source device a control message including the packet sending rate.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (and databases or other repositories arranged in any desired fashion, where the present embodiments may be applied to any desired type of computing environment (e.g., cloud computing, client-server, network computing, mainframe, stand-alone systems, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network. The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, Python, or the like, and procedural programming languages, such as the "C" programming language or similar programming languages.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method comprising:
   at a network device having network ports to communicate with source devices and destination devices, receiving respective packets from each source device, and for each source device, respectively:
   storing the respective packets that are received in a shared memory used to store all packets that are received from all of the source devices;
   dequeuing the respective packets from the shared memory to send the packets to a respective one of the destination devices;
   responsive to the storing and the dequeuing, respectively increasing and decreasing an input packet count associated with the source device to indicate a contribution of the respective packets to a total packet occupancy of the shared memory;
   computing a free memory threshold that is a dynamic threshold indicative of an amount of free memory available in the shared memory for packets;
   determining whether the input packet count exceeds the free memory threshold;
   when the input packet count does not exceed the free memory threshold, determining for the source device a packet sending rate individualized to the source device based on the input packet count and a flow control threshold that is common across all of the source devices in accordance with a proportional integral (PI) control equation;
   when the input packet exceeds the free memory threshold, setting the packet sending rate equal to a predetermined minimum packet sending rate that is less than the flow control threshold; and
   transmitting to the source device a control message including the packet sending rate.

2. The method of claim 1, wherein the determining includes:
   computing a change in the input packet count from a previous input packet count;
   computing a deviation of the input packet count from the flow control threshold; and
   computing the packet sending rate based on the change, the deviation, and a previous packet sending rate according to the PI control equation.

3. The method of claim 2, wherein the PI control equation is given by:

the packet sending rate=the previous packet sending rate−$A$*(input_cnt−(the flow the flow control threshold)−$B$*(input_cnt−old_input_cnt), where:

input_cnt is the input packet count;
old_input_cnt is a previous input packet count associated with the previous packet sending rate; and
A and B are control parameters.

4. The method of claim 1, wherein the control message further includes a type field to indicate the control message is a flow control message, and a tuple that conveys a source address of the source device.

5. The method of claim 1, further comprising:
performing pause control including:
  determining if the input packet count exceeds the free memory threshold; and
  if the input packet count exceeds or does not exceed the free memory threshold, commanding the source device to not send packets or to send packets, respectively.

6. The method of claim 5, further comprising:
repeating at a first frequency the determining the packet sending rate in accordance with the PI control equation and the transmitting the packet sending rate; and
repeating the performing the pause control at a second frequency that is higher than the first frequency.

7. The method of claim 5, wherein the commanding includes transmitting a control message that includes the packet sending rate as determined and either a transmit off command or a transmit on command commanding the source device to not send packets or to send packets, respectively.

8. The method of claim 1, wherein the packet sending rate is configured to, when implemented at the source device, cause the input packet count to stabilize around the flow control threshold over time.

9. The method of claim 1, wherein the flow control threshold for the input packet count is a predetermined static threshold.

10. The method of claim 1, further comprising:
computing the flow control threshold as a dynamic threshold that is less than the free memory threshold.

11. An apparatus comprising:
network ports to communicate with source devices and destination devices; and
a processor coupled to the network ports and configured to perform receiving respective packets from each source device, and for each source device, respectively, perform operations including:
  storing the respective packets that are received in a shared memory used to store all packets that are received from all of the source devices;
  dequeuing the respective packets from the shared memory to send the packets to a respective one of the destination devices;
  responsive to the storing and the dequeuing, respectively increasing and decreasing an input packet count associated with the source device to indicate a contribution of the respective packets to a total packet occupancy of the shared memory;
  determining for the source device a packet sending rate individualized to the source device based on the input packet count and a flow control threshold that is common across all of the source devices in accordance with a proportional integral (PI) control equation;
  computing a free memory threshold that is a dynamic threshold indicative of an amount of free memory available in the shared memory for packets;
  performing pause control including:
    determining if the input packet count exceeds the free memory threshold; and
    if the input packet count exceeds or does not exceed the free memory threshold, commanding the source device to not send packets or to send packets, respectively; and
  transmitting to the source device a control message including the packet sending rate.

12. The apparatus of claim 11, wherein the determining includes:
computing a change in the input packet count from a previous input packet count;
computing a deviation of the input packet count from the flow control threshold; and
computing the packet sending rate based on the change, the deviation, and a previous packet sending rate according to the PI control equation.

13. The apparatus of claim 12, wherein the PI control equation is given by:

the packet sending rate=the previous packet sending rate−$A$*(input_cnt−the flow control threshold)−$B$*(input_cnt−old_input_cnt), where:

input_cnt is the input packet count;
old_input_cnt is a previous input packet count associated with the previous packet sending rate; and
A and B are control parameters.

14. The apparatus of claim 11, wherein the processor is further configured to perform:
determining if the input packet count exceeds the free memory threshold;
if the input packet count exceeds the free memory threshold, setting the packet sending rate equal to a predetermined minimum packet sending rate that is less than the flow control threshold; and
if the input packet count does not exceed the free memory threshold, performing the determining the packet sending rate in accordance with the PI control equation.

15. The apparatus of claim 11, wherein the control message further includes a type field to indicate the control message is a flow control message, and a tuple that conveys a source address of the source device.

16. The apparatus of claim 15, wherein the processor is further configured to perform:
repeating at a first frequency the determining the packet sending rate in accordance with the PI control equation and the transmitting the packet sending rate; and
repeating the performing the pause control at a second frequency that is higher than the first frequency.

17. The apparatus of claim 15, wherein the commanding includes transmitting a control message that includes the packet sending rate as determined and either a transmit off command or a transmit on command commanding the source device to not send packets or to send packets, respectively.

18. A non-transitory computer readable medium encoded with instructions that, when executed by a processor of a network device having network ports to communicate with source devices and destination devices, cause the processor to perform, receiving respective packets from each source device, and for each source device, respectively:
storing the respective packets that are received in a shared memory used to store all packets that are received from all of the source devices;

dequeuing the respective packets from the shared memory to send the packets to a respective one of the destination devices;

responsive to the storing and the dequeuing, respectively increasing and decreasing an input packet count associated with the source device to indicate a contribution of the respective packets to a total packet occupancy of the shared memory;

determining for the source device a packet sending rate individualized to the source device based on the input packet count and a flow control threshold that is common across all of the source devices in accordance with a proportional integral (PI) control equation given by:

the packet sending rate=a previous packet sending rate$-A*$(input_cnt$-$the flow control threshold)$-B*$(input_cnt$-$old_input_cnt), where input_cnt is the input packet count, old_input_cnt is a previous input packet count associated with the previous packet sending rate, and A and B are control parameters; and transmitting to the source device a control message including the packet sending rate.

19. The non-transitory computer readable medium of claim 18, wherein the determining includes:

computing a change in the input packet count from a previous input packet count;

computing a deviation of the input packet count from the flow control threshold; and computing the packet sending rate based on the change, the deviation, and a previous packet sending rate according to the PI control equation.

20. The non-transitory computer readable medium of claim 19, wherein the control message further includes a type field to indicate the control message is a flow control message, and a tuple that conveys a source address of the source device.

* * * * *